(12) United States Patent
Suzuki et al.

(10) Patent No.: US 11,367,989 B1
(45) Date of Patent: Jun. 21, 2022

(54) LIGHT EMITTING UNIT AND LIGHT SOURCE DEVICE

(71) Applicants: HAMAMATSU PHOTONICS K.K., Hamamatsu (JP); ENERGETIQ TECHNOLOGY, INC., Wilmington, MA (US)

(72) Inventors: Akio Suzuki, Hamamatsu (JP); Toru Fujita, Hamamatsu (JP); Akinori Asai, Hamamatsu (JP); Yusei Nagata, Hamamatsu (JP); Shinichi Ohba, Hamamatsu (JP); Matthew Partlow, Somerville, MA (US); Ron Collins, Londonderry, NH (US); Stephen F. Horne, Medford, MA (US); Laura Owens, Arlington, MA (US)

(73) Assignees: Hamamatsu Photonics K.K., Hamamatsu (JP); Energetiq Technology, Inc., Wilmington, MA (US)

( * ) Notice: Subject to any disclaimer, the term of this patent is extended or adjusted under 35 U.S.C. 154(b) by 0 days.

(21) Appl. No.: 17/129,755

(22) Filed: Dec. 21, 2020

(51) Int. Cl.
*H01S 3/038* (2006.01)
*H01S 3/034* (2006.01)
(Continued)

(52) U.S. Cl.
CPC .............. *H01S 3/038* (2013.01); *H01S 3/034* (2013.01); *H01S 3/09702* (2013.01); *H05G 2/008* (2013.01); *H05H 1/24* (2013.01)

(58) Field of Classification Search
CPC ...... H01S 3/038; H01S 3/034; H01S 3/09702; H05H 1/24; H05G 2/008
See application file for complete search history.

(56) References Cited

U.S. PATENT DOCUMENTS

| 6,522,679 | B1 * | 2/2003 | Strowitzki | .............. | H01S 3/038 |
| | | | | | 372/51 |
| 7,435,982 | B2 | 10/2008 | Smith | | |

(Continued)

FOREIGN PATENT DOCUMENTS

| JP | 6211912 | 10/2017 |
| JP | 6224445 | 11/2017 |

(Continued)

OTHER PUBLICATIONS

A Hamamatsu Company, "High Brightness Broadband Infrared Laser-Driven Light Source, from 0.3 to 20 Microns", R. Collins et al., May 5, 2019.

(Continued)

*Primary Examiner* — Xinning (Tom) Niu
(74) *Attorney, Agent, or Firm* — Proskauer Rose LLP

(57) ABSTRACT

A light emitting unit includes a light emitting sealed body and a voltage application circuit. The light emitting sealed body includes a container to which laser light for maintaining plasma is incident and from which light from the plasma is emitted, a first electrode which includes a first discharge portion, and a second electrode which includes a second discharge portion. An end portion of the first discharge portion has a shape in which a thickness is thinned as it goes toward the second discharge portion and an end surface of the second discharge portion extends along a plane perpendicular to an extending direction of the first discharge portion. The voltage application circuit controls a potential difference between the first electrode and the second electrode by adjusting a voltage applied to at least the first electrode.

12 Claims, 16 Drawing Sheets

(51) Int. Cl.
    *H01S 3/097*     (2006.01)
    *H05H 1/24*     (2006.01)
    *H05G 2/00*     (2006.01)

(56) References Cited

U.S. PATENT DOCUMENTS

| | | | |
|---|---|---|---|
| 7,786,455 B2 | 8/2010 | Smith | |
| 7,989,786 B2 | 8/2011 | Smith et al. | |
| 8,309,943 B2 | 11/2012 | Smith et al. | |
| 8,525,138 B2 | 9/2013 | Smith et al. | |
| 8,921,814 B2 * | 12/2014 | Pellemans | H05B 41/38 |
| | | | 250/504 R |
| 8,969,841 B2 | 3/2015 | Smith | |
| 9,048,000 B2 | 6/2015 | Smith | |
| 9,185,786 B2 | 11/2015 | Smith | |
| 9,357,626 B2 | 5/2016 | Pellemans et al. | |
| 9,576,785 B2 | 2/2017 | Blondia | |
| 9,609,732 B2 | 3/2017 | Smith | |
| 9,646,816 B2 | 5/2017 | Asai et al. | |
| 9,741,553 B2 | 8/2017 | Blondia | |
| 9,748,086 B2 | 8/2017 | Blondia | |
| 9,814,126 B2 | 11/2017 | Van Heumen | |
| 9,824,879 B2 | 11/2017 | Asai et al. | |
| 9,913,357 B2 | 3/2018 | Van Heumen | |
| 9,922,814 B2 | 3/2018 | Blondia | |
| 9,924,585 B2 | 3/2018 | Van Heumen | |
| 9,984,865 B2 | 5/2018 | Asai et al. | |
| 10,032,620 B2 | 7/2018 | Wilson et al. | |
| 10,032,622 B2 | 7/2018 | Asai et al. | |
| 10,057,973 B2 | 8/2018 | Blondia | |
| 10,109,473 B1 | 10/2018 | Blondia et al. | |
| 10,186,414 B2 | 1/2019 | Blondia | |
| 10,186,416 B2 | 1/2019 | Blondia | |
| 10,420,197 B2 | 9/2019 | Van Heumen | |
| 10,504,714 B2 | 12/2019 | Blondia | |
| 10,561,008 B2 | 2/2020 | Mori et al. | |
| 10,609,804 B2 | 3/2020 | Mori et al. | |
| 2001/0030986 A1 * | 10/2001 | Bragin | H01S 3/036 |
| | | | 372/57 |
| 2004/0066827 A1 * | 4/2004 | Steiger | H01S 3/0388 |
| | | | 372/87 |
| 2004/0114647 A1 * | 6/2004 | Sukhman | H01S 3/2232 |
| | | | 372/36 |
| 2010/0164380 A1 | 7/2010 | Sumitomo | |
| 2019/0021158 A1 | 1/2019 | Nozaki | |
| 2019/0045615 A1 | 2/2019 | Mori et al. | |
| 2019/0053364 A1 | 2/2019 | Mori et al. | |

FOREIGN PATENT DOCUMENTS

| | | |
|---|---|---|
| JP | 2017-220319 | 12/2017 |
| JP | 2018-060640 | 4/2018 |

OTHER PUBLICATIONS

Collins et al., "High Brightness Broadband Infrared Light Source, from 0.3 to 20 Microns", Energetiq Technology, Inc., Woburn, MA 01801, USA, May 5, 2019.

Mini-poster displayed at "LASER World of PHOTONICS 2019" Jun. 24-27, 2019; Munich, Germany.

Wagner et al., "Ultrabroadband Nanospectroscopy with a Laser-Driven Plasma Source", ACS Photonics, Feb. 5, 2018, p. 1467-p. 1475.

* cited by examiner

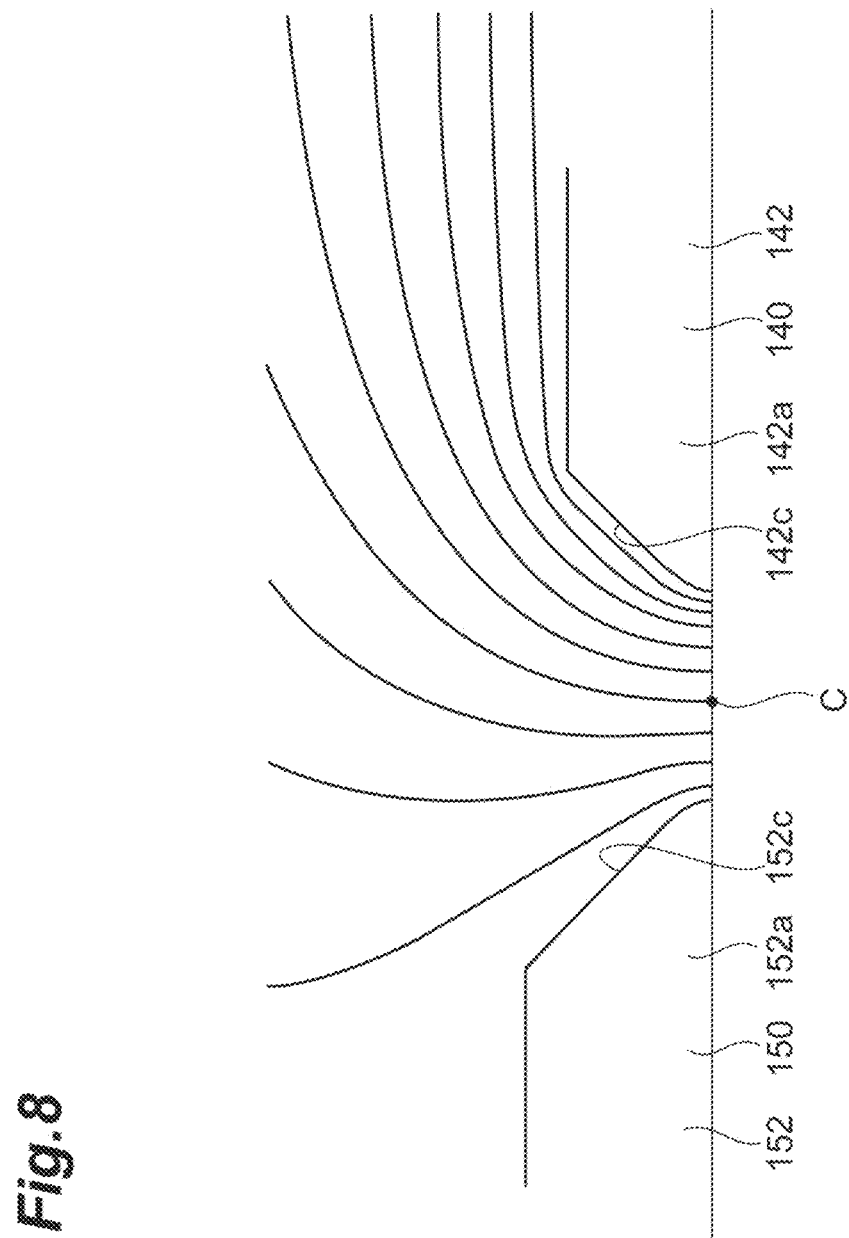

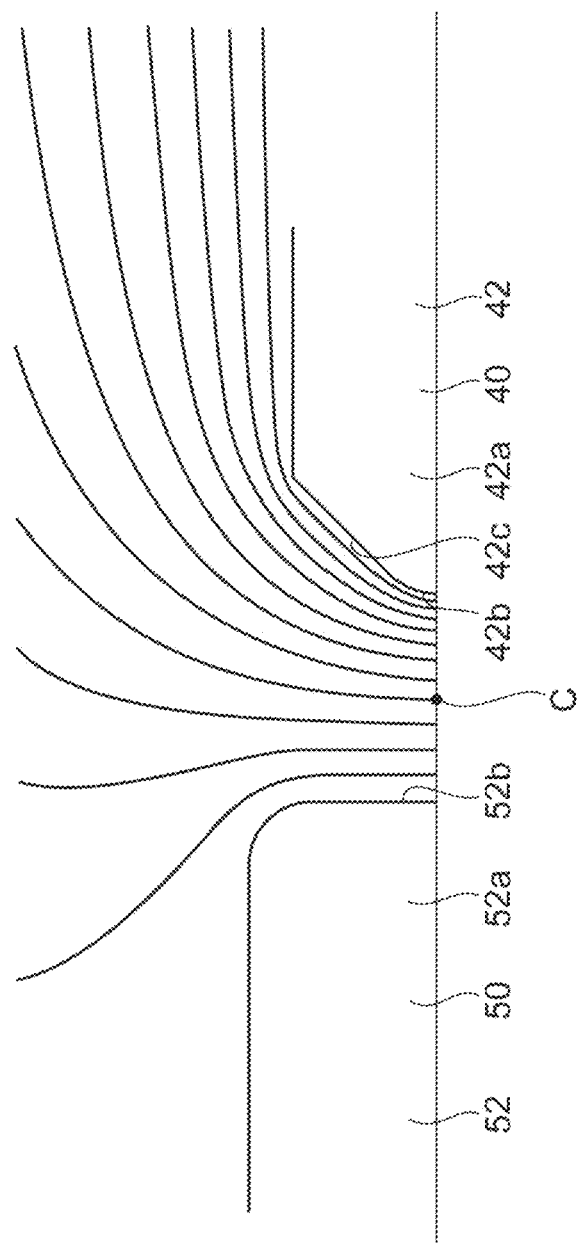

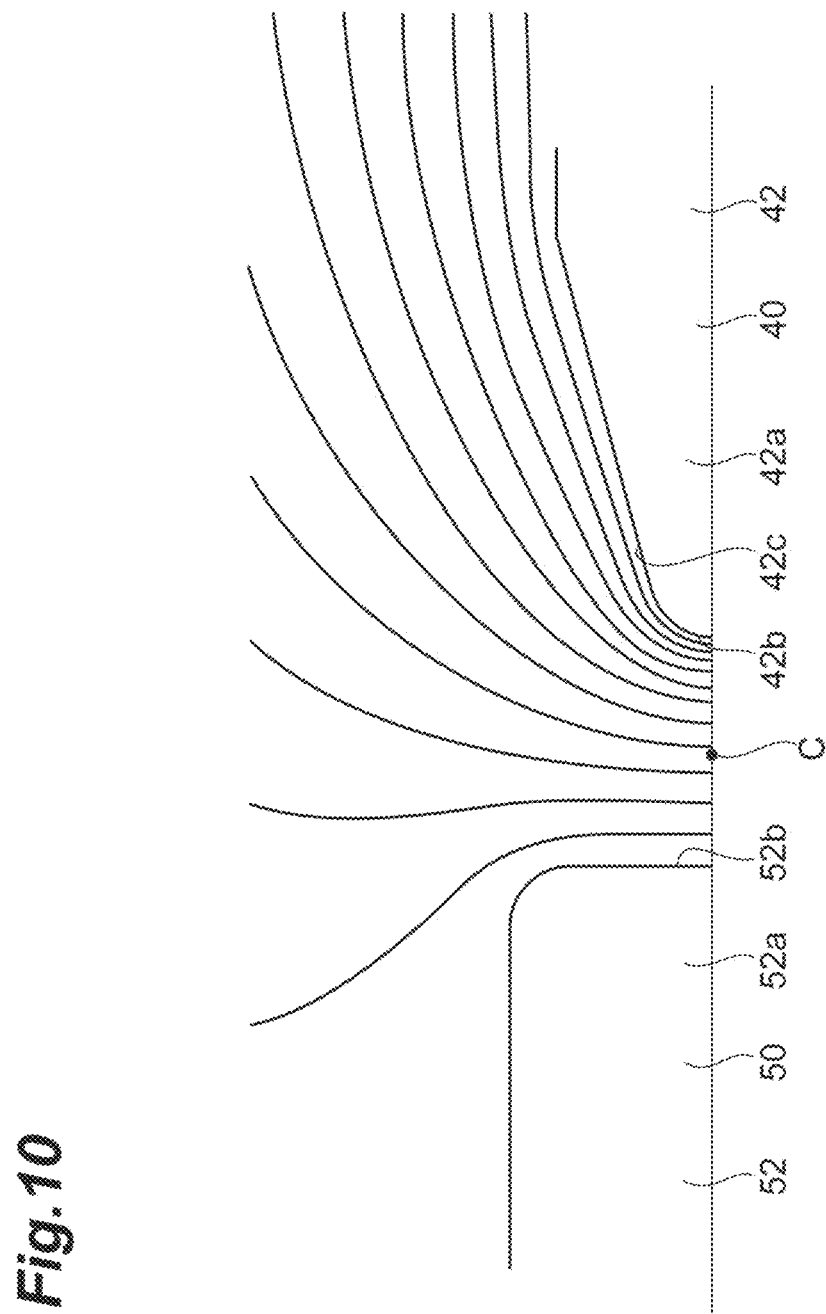

LIGHT EMITTING UNIT AND LIGHT SOURCE DEVICE

TECHNICAL FIELD

An aspect of the present disclosure relates to a light emitting unit and a light source device.

BACKGROUND

A laser excitation light source is known as a light source in which a discharge gas is enclosed in a container, plasma generated in the discharge gas is maintained by the irradiation of laser light, and light from the plasma is output as output light (for example, see U.S. patent Ser. No. 10/032,620 and US Patent No. 2010/0164380).

SUMMARY

In the above-described laser excitation light source, a discharge gas is enclosed at a high pressure for high efficiency and high output. However, when the discharge gas enclosed pressure becomes higher, a discharge starting voltage increases according to Paschen's law and plasma is difficult to be generated in the discharge gas.

An object of an aspect of the present disclosure is to provide a light emitting unit and a light source device capable of reducing a discharge starting voltage.

A light emitting unit according to an aspect of the present disclosure includes: a light emitting sealed body; and a voltage application circuit, in which the light emitting sealed body includes a container which encloses a discharge gas therein and is configured such that laser light for maintaining plasma generated in the discharge gas can be incident to the container and light from the plasma can be emitted from the container, a first electrode which includes a first discharge portion having a rod shape and disposed inside the container, and a second electrode which includes a second discharge portion having a rod shape and disposed inside the container so as to face the first discharge portion in an extending direction of the first discharge portion, in which an end portion of the first discharge portion on the side of the second discharge portion has a shape in which a thickness is thinned as it goes toward the second discharge portion, in which an end surface of the second discharge portion on the side of the first discharge portion extends along a plane perpendicular to the extending direction, and in which the voltage application circuit is configured to control a potential difference between the first electrode and the second electrode by adjusting a voltage applied to at least the first electrode.

In the light emitting unit, the end portion of the first discharge portion on the side of the second discharge portion has a shape in which a thickness is thinned as it goes toward the second discharge portion and the end surface of the second discharge portion on the side of the first discharge portion extends along a plane perpendicular to the extending direction of the first discharge portion. Accordingly, the electric field strength (electric field density) in the vicinity of the end portion of the first discharge portion can be increased. Then, the voltage application circuit controls a potential difference between the first electrode and the second electrode by adjusting a voltage applied to the first electrode. In this way, when a voltage is applied to the first electrode of which the electric field strength in the vicinity of the end portion is increased, a discharge can be easily generated and a discharge starting voltage can be reduced.

The voltage application circuit may be configured to apply a negative voltage pulse to the first electrode as a trigger voltage for generating the plasma between the first electrode and the second electrode. In this case, a discharge can be further easily generated.

The voltage application circuit may be configured to apply a positive voltage pulse to the second electrode in accordance with a timing at which the negative voltage pulse is applied to the first electrode. In this case, the absolute value of the peak voltage of each of the negative voltage pulse applied to the first electrode and the positive voltage pulse applied to the second electrode can be reduced compared to a case in which the negative voltage pulse is applied only to the first electrode. As a result, for example, noise when generating the negative voltage pulse and the positive voltage pulse can be reduced.

The end portion of the first discharge portion may have a tapered surface and a taper angle of the tapered surface may be 120° or less. In this case, the electric field strength in the vicinity of the end portion of the first discharge portion can be further increased and a discharge can be further easily generated.

The taper angle may be 45° or less. In this case, the electric field strength in the vicinity of the end portion of the first discharge portion can be still further increased and a discharge can be still further easily generated.

The container may include a housing which stores the discharge gas and is provided with a first opening to which first light is incident and a second opening from which second light is emitted, in which the first light is the laser light and the second light is light from the plasma, a first window portion which hermetically seals the first opening and allows the first light to be transmitted therethrough, and a second window portion which hermetically seals the second opening and allows the second light to be transmitted therethrough and the housing may be formed of a light shielding material that blocks the first light and the second light. In this case, since a high-strength material can be selected as the light shielding material, the discharge gas enclosed pressure can be increased. As a result, high efficiency and high output can be achieved.

The housing may be formed of a metal material. In this case, the discharge gas enclosed pressure can be further increased.

The first electrode may be fixed to the housing through an insulation member and may be electrically separated from the housing. In this case, a voltage can be applied to the first electrode. The housing may be formed of an insulating material. In this case, components held by the housing can be easily and electrically separated from each other.

The second electrode may be electrically connected to the housing. In this case, the second electrode can be set to a ground potential by the connection to the housing and a wiring for a ground potential can be omitted.

The first electrode may be fixed to the housing via a first insulation member and may be electrically separated from the housing and the second electrode may be fixed to the housing via a second insulation member and may be electrically separated from the housing. In this case, a voltage can be individually applied to the first electrode and the second electrode.

A light source device according to an aspect of the present disclosure includes the light emitting unit; and a light introduction unit which allows the laser light to be incident into the container. According to the light source device, the discharge starting voltage can be reduced due to the above-described reasons.

According to an aspect of the present disclosure, it is possible to provide the light emitting unit and the light source device capable of reducing the discharge starting voltage.

BRIEF DESCRIPTION OF THE DRAWINGS

FIG. 8 is a diagram illustrating an example of an electric field distribution generated in a second comparative example.

FIG. 9 is a diagram illustrating an example of an electric field distribution generated in a first modified example.

FIG. 10 is a diagram illustrating an example of an electric field distribution generated in the configuration of FIG. 6.

DETAILED DESCRIPTION

Figure 1:
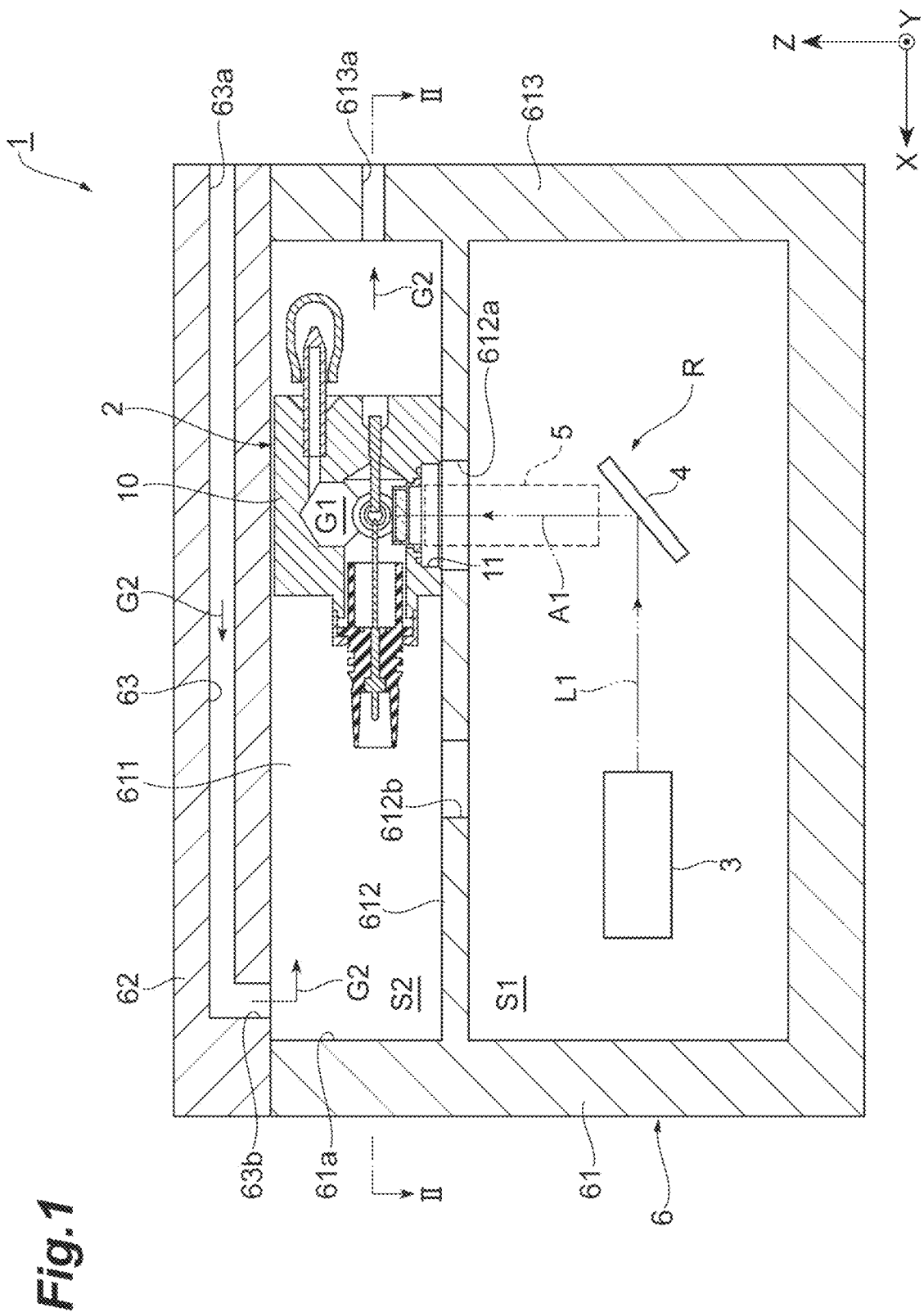
FIG. 1 is a cross-sectional view of a laser excitation light source according to an embodiment.
Figure 2:
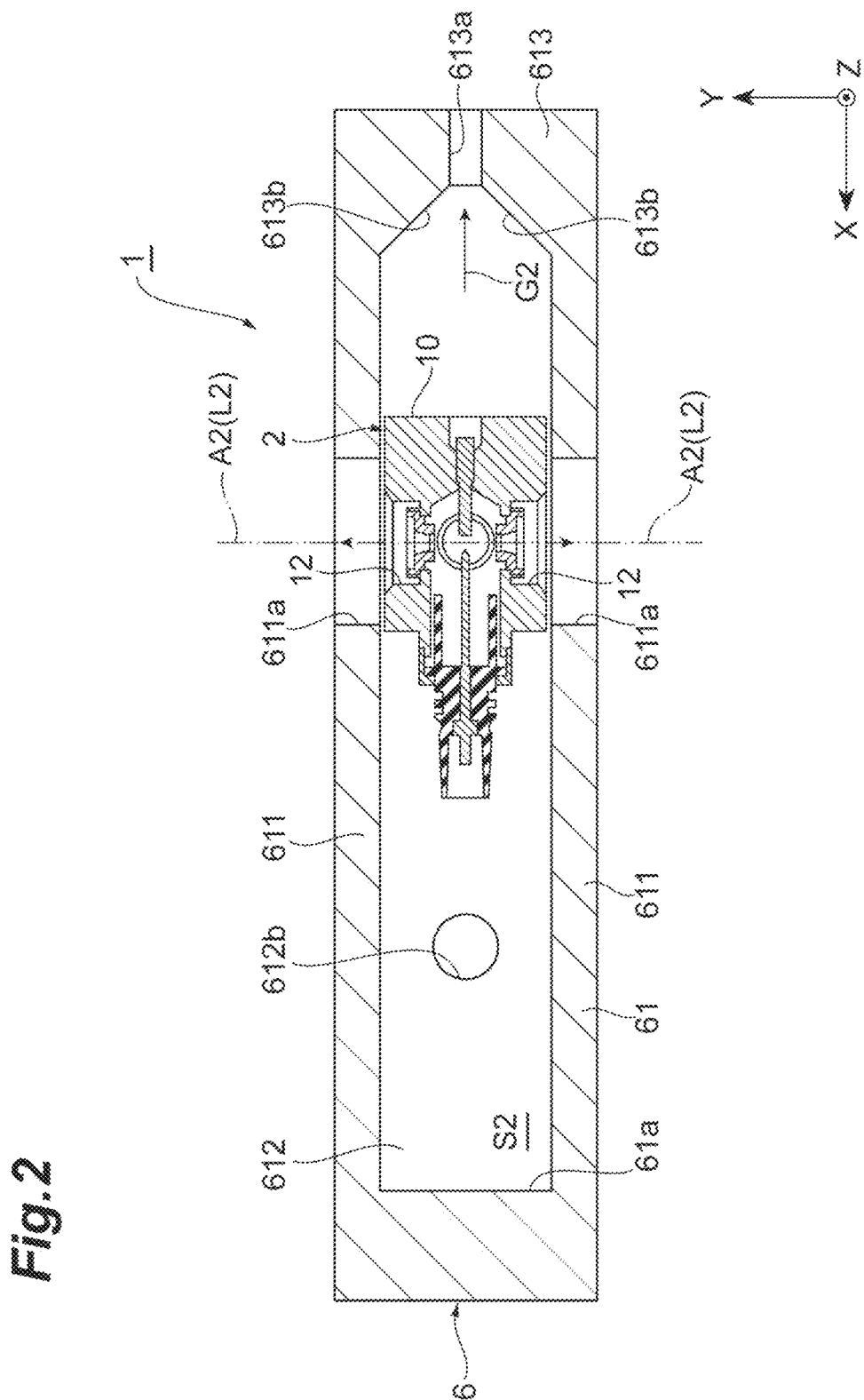
FIG. 2 is a cross-sectional view taken along line II-II of FIG. 1.
Figure 3:
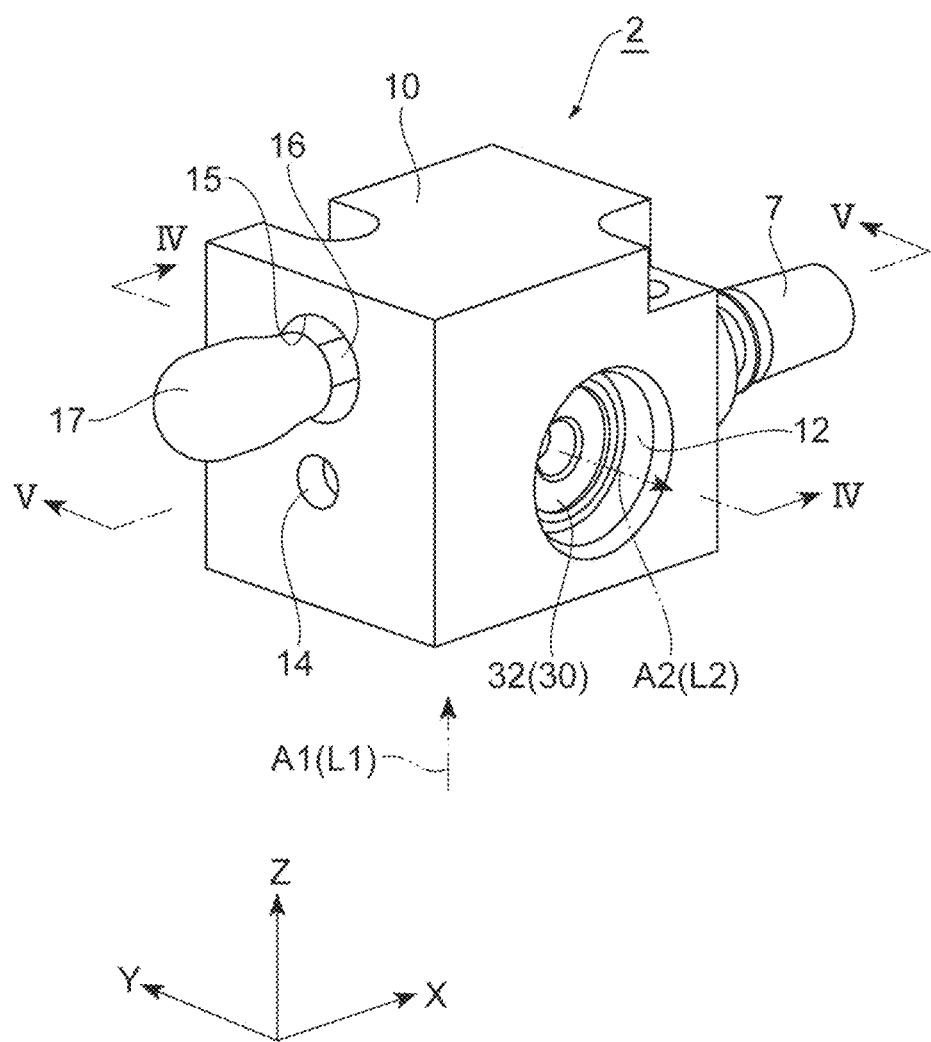
FIG. 3 is a perspective view of a light emitting sealed body according to the embodiment.

Hereinafter, an embodiment of the invention will be described in detail with reference to the drawings. Additionally, in the following description, the same or corresponding components will be denoted by the same reference symbols without redundant description.

[Configuration of Laser Excitation Light Source]

As illustrated in FIGS. 1 to 5, a laser excitation light source (the light emitting unit, light source device) 1 includes a light emitting sealed body 2, a laser light source 3, a mirror 4, an optical system 5, and a casing (lamp house) 6. The light emitting sealed body 2, the laser light source 3, the mirror 4, and the optical system 5 are stored inside the casing 6. A discharge gas G1 is enclosed in the light emitting sealed body 2. The discharge gas G1 is, for example, a xenon gas. In the laser excitation light source 1, plasma is generated in the discharge gas G1. First light L1 which is laser light for maintaining plasma is incident to the light emitting sealed body 2 and second light L2 which is light from plasma is emitted from the light emitting sealed body 2 as output light. The first light has a wavelength of, for example, about 800 nm to 1100 nm. The second light L2 is, for example, light in the mid-infrared region and has a wavelength of about 2 μm to 20 μm. The light emitting sealed body 2 will be described in detail later.

The laser light source 3 is, for example, a laser diode and outputs the first light L1 which is laser light. The mirror 4 reflects the first light L1 from the laser light source 3 toward the optical system 5. The optical system 5 includes one or plural lenses. The optical system 5 guides the first light L1 from the mirror 4 to the light emitting sealed body 2 while condensing the first light L1. The laser light source 3, the mirror 4, and the optical system 5 constitute a light introduction unit R which causes the first light L1 to be incident to a first opening 11 along a first optical axis A1. The first opening 11 and the first optical axis A1 will be described later.

The casing 6 includes a main body portion 61 and a lid member 62. A storage space S1 is formed inside the main body portion 61 and the laser light source 3, the mirror 4, and the optical system 5 are arranged inside the storage space S1. A depression 61a is formed in the main body portion 61 and an opening portion of the depression 61a is closed by the lid member 62 so as to form a storage space S2. The light emitting sealed body 2 is disposed inside the storage space S2. The main body portion 61 includes a pair of wall portions 611 which define the depression 61a and each wall portion 611 is provided with an opening 611a through which the second light L2 emitted from the light emitting sealed body 2 passes. The second light L2 passes through the opening 611a and is emitted to the outside.

The main body portion 61 includes a wall portion 612 which divides the storage space S1 and the depression 61a and the storage space S1 and the storage space S2 are divided by the wall portion 612. Further, an opening 612a is formed in the wall portion 612. A part of the optical system 5 is disposed inside the opening 612a and the first light L1 passes through the opening 612a and is incident to the light emitting sealed body 2.

A flow path 63 is formed inside the lid member 62. A gas G2 flows in the flow path 63. The gas G2 is, for example, an inert gas such as nitrogen. The flow path 63 is connected to the outside through an opening 63a and the gas G2 is supplied from an external gas supply device (not illustrated) to the flow path 63 through the opening 63a. The flow path 63 is connected to the storage space S2 of the main body portion 61 through an opening 63b and the gas G2 flows from the flow path 63 into the storage space S2 through the opening 63b.

The gas G2 passes between the wall portions 611 and 612 of the main body portion 61 and the light emitting sealed body 2 and/or between the lid member 62 and the light emitting sealed body 2 and is discharged from a ventilation hole 613a to the outside. The ventilation hole 613a is a through-hole which is formed in a wall portion 613 of the main body portion 61 so as to communicate with the storage space S2. The wall portion 613 includes a pair of tapered surfaces 613b which are respectively formed at the boundary portions of the pair of wall portions 611. The pair of tapered surfaces 613b are inclined so as to be closer to each other as it goes toward the ventilation hole 613a. Each tapered surface 613b is connected to the ventilation hole 613a. The tapered surface 613b guides the gas G2 toward the ventilation hole 613a. A through-hole 612b is formed in the wall portion 612 of the main body portion 61 and a part of the gas G2 flowing from the flow path 63 to the storage space S2 passes through the through-hole 612b and flows into the storage space S1.

[Configuration of Light Emitting Sealed Body]

The light emitting sealed body 2 includes a housing 10, a first window portion 20, two second window portions 30, a first electrode 40, and a second electrode 50.

The housing 10 is formed in a substantially box shape by a metal material and stores the discharge gas G1. More specifically, a sealed internal space S3 is formed inside the housing 10 and the internal space S3 is filled with the discharge gas G1. As an example of the metal material forming the housing 10, stainless steel is exemplified. In this case, the housing 10 has a light shielding property with respect to the first light L1 and the second light L2. That is, the housing 10 is formed of a light shielding material which does not allow the first light L1 and the second light L2 to be transmitted therethrough.

The first opening 11 and two second openings 12 are formed in the housing 10. The first light L1 is incident to the first opening 11 along the first optical axis A1. The first opening 11 is formed in a circular shape, for example, as viewed from a direction (hereinafter, referred to as a Z-axis direction) parallel to the first optical axis A1. In this example, the first optical axis A1 passes through the center of the first opening 11 as viewed from the Z-axis direction. The first opening 11 includes an inner portion 11a, a middle portion 11b, and an outer portion 11c. The inner portion 11a opens to the internal space S3. The outer portion 11c opens to the outside. The middle portion 11b is connected to the inner portion 11a and the outer portion 11c. Each of the inner portion 11a, the middle portion 11b, and the outer portion 11c has, for example, a cylindrical shape. The diameter (outer shape) of the middle portion 11b is larger than the diameter (outer shape) of the inner portion 11a and the diameter (outer shape) of the outer portion 11c is larger than the diameter (outer shape) of the middle portion 11b. A part of the optical system 5 is disposed in the outer portion 11c.

The second light L2 is emitted from each second opening 12 along a second optical axis A2. Each second opening 12 is formed in, for example, a circular shape as viewed from a direction (hereinafter, referred to as a Y-axis direction) parallel to the second optical axis A2. In this example, the second optical axis A2 passes through the center of the second opening 12 as viewed from the Y-axis direction. Each second opening 12 includes an inner portion 12a, a middle portion 12b, and an outer portion 12c. The inner portion 12a opens to the internal space S3. The outer portion 12c opens to the outside. The middle portion 12b is connected to the inner portion 12a and the outer portion 12c. Each of the inner portion 12a, the middle portion 12b, and the outer portion 12c has, for example, a cylindrical shape. The diameter (outer shape) of the middle portion 12b is larger than the diameter (outer shape) of the inner portion 12a and the diameter (outer shape) of the outer portion 12c is larger than the diameter (outer shape) of the middle portion 12b.

The first optical axis A1 intersects the second optical axis A2 inside the internal space S3. That is, the first opening 11 and the second opening 12 are disposed so that the first optical axis A1 and the second optical axis A2 intersect each other. An intersection C between the first optical axis A1 and the second optical axis A2 is located inside the internal space S3. In this example, the first optical axis A1 perpendicularly intersects the second optical axis A2, but the first optical axis A1 may intersect the second optical axis A2 at an angle other than a right angle. The first optical axis A1 is not parallel to the second optical axis A2.

The first optical axis A1 does not pass through the second opening 12 and the second optical axis A2 does not pass through the first opening 11.

The first window portion 20 hermetically seals the first opening 11. The first window portion 20 includes a first window member 21 and a first frame member 22. The first window member 21 is formed in, for example, a circular flat plate shape by a translucent material that allows the first light L1 to be transmitted therethrough. In this example, the first window member 21 is formed of sapphire and allows light having a wavelength of 5 μm or less to be transmitted therethrough.

The first frame member 22 is formed in, for example, a frame shape by Kovar metal. The first frame member 22 is formed in a substantially cylindrical shape as a whole. The first frame member 22 includes a first portion 22a having a cylindrical shape and a second portion 22b having a cylindrical shape and integrally formed with the first portion 22a. The outer shape of the second portion 22b is larger than the outer shape of the first portion 22a.

The first window member 21 is disposed inside the first portion 22a. Specifically, a boundary portion between the inner surface of the first portion 22a and the inner surface of the second portion 22b is provided with a circular ring-shaped protrusion portion 22c which protrudes inward and the first window member 21 is disposed inside the first portion 22a while contacting the protrusion portion 22c. In this state, a side surface 21a of the first window member 21 contacts the inner surface of the first portion 22a.

The side surface 21a of the first window member 21 is hermetically joined to the inner surface of the first portion 22a over the entire circumference by a joining material (first joining material) 23. Accordingly, a gap between the first window member 21 and the first frame member 22 is hermetically sealed. The joining material 23 is, for example, a metal brazing material and is, more specifically, a titanium-doped silver brazing material. The titanium-doped silver brazing material is a brazing material composed of, for example, 70% of silver, 28% of copper, and 2% of Ti and is, for example, TB-608T manufactured by Tokyo Braze Co., Ltd.

An outer surface of the second portion 22b is provided with a circular ring-shaped flange portion 22d which protrudes outward. The first frame member 22 is fixed to the housing 10 while the flange portion 22d is disposed inside the middle portion 11b of the first opening 11. In this state, a part of the first portion 22a of the first frame member 22 protrudes from the first opening 11. The first window member 21 is disposed so as to face the intersection C between the first optical axis A1 and the second optical axis A2. In this example, the light incident surface and the light emitting surface of the first window member 21 are flat surfaces which extend so as to be perpendicular to the Z-axis direction.

Figure 4:
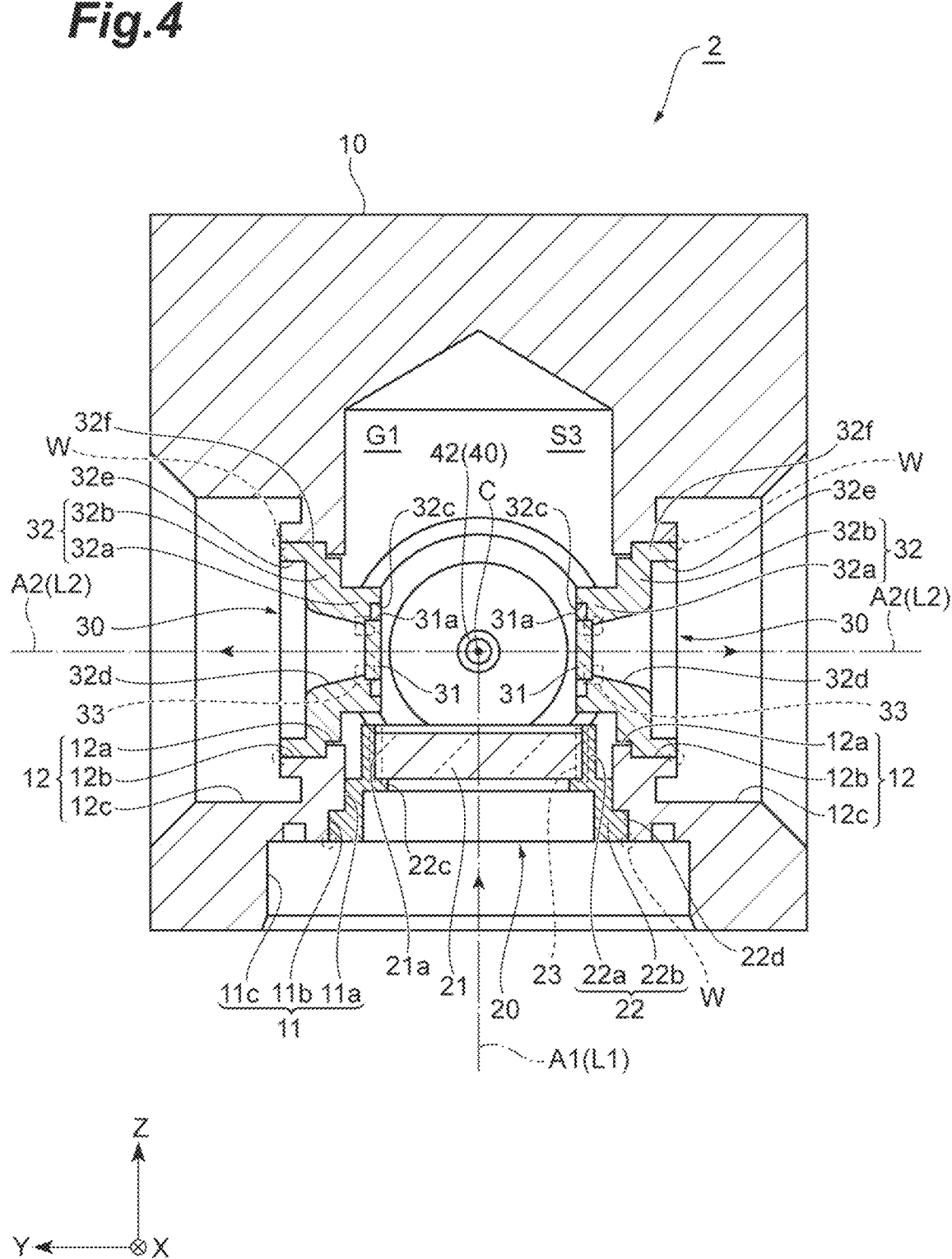
FIG. 4 is a cross-sectional view taken along line IV-IV of FIG. 3.
Figure 5:
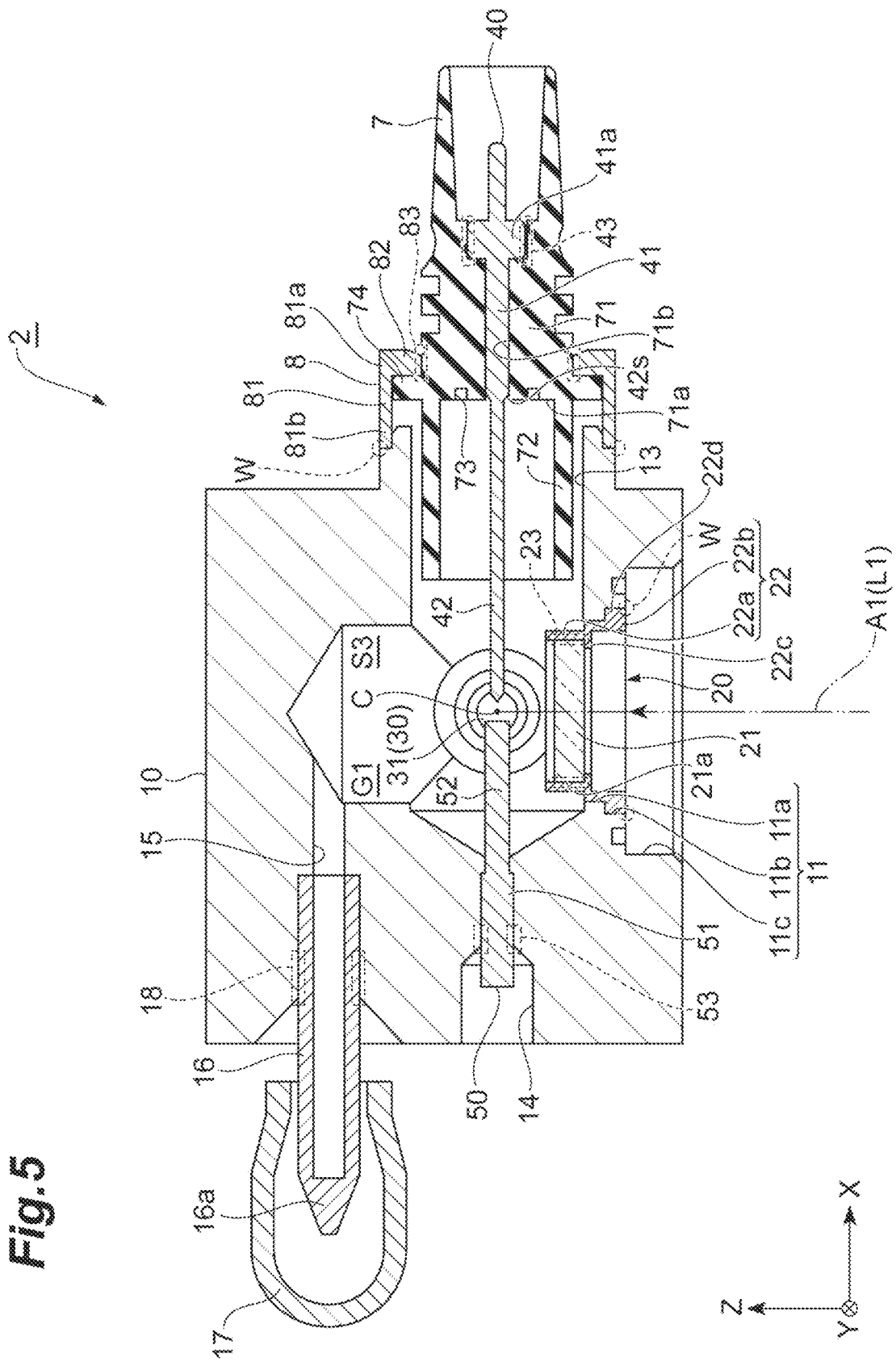
FIG. 5 is a cross-sectional view taken along line V-V of FIG. 3.

The first frame member 22 is hermetically fixed to the housing by laser welding. More specifically, a contact portion between the flange portion 22d and the inner surface of the middle portion 11b of the first opening 11 is irradiated with laser from the outside to be welded over the entire circumference, so that the first frame member 22 is hermetically joined to the housing 10. In FIGS. 4 and 5, a welded part is denoted by the sign W. Accordingly, a part between the first frame member 22 and the housing 10 is hermetically sealed. In this way, the first window member 21 is hermetically joined to the first frame member 22 by the joining material 23 and is hermetically fixed to the housing 10 via the first frame member 22. Since the first frame member 22 is interposed between the first window member 21 and the housing 10, problems caused by a difference in thermal expansion rate between the first window member 21 and the housing 10 can be suppressed.

Each second window portion 30 hermetically seals the second opening 12. Each second window portion 30 includes a second window member 31 and a second frame member 32. The second window member 31 is formed in, for example, a circular flat plate shape by a translucent material that allows the second light L2 to be transmitted therethrough. In this example, the second window member 31 is formed of diamond and allows light having a wavelength of 20 µm or less to be transmitted therethrough.

The second frame member 32 is formed in, for example, a frame shape by Kovar metal. The second frame member 32 is formed in a substantially cylindrical shape as a whole. The second frame member 32 includes a first portion 32a having a cylindrical shape and a second portion 32b having a cylindrical shape and integrally formed with the first portion 32a. The outer shape of the second portion 32b is larger than the outer shape of the first portion 32a.

The second window member 31 is disposed inside the first portion 32a. Specifically, the first portion 32a includes an arrangement portion 32c therein and the second window member 31 is disposed inside the arrangement portion 32c. In this state, a part on the side opposite to the intersection C in the side surface 31a of the second window member 31 contacts the inner surface of the first portion 32a. A space inside the second frame member 32 further includes a middle portion 32d connected to the arrangement portion 32c and an outer portion 32e connected to the middle portion 32d. The middle portion 32d has a truncated cone shape in which a diameter (outer shape) increases when going outward. The outer portion 32e is formed in a cylindrical shape having a diameter (outer shape) larger than the middle portion 32d.

The side surface 31a of the second window member 31 is hermetically joined to the inner surface of the first portion 32a over the entire circumference by a joining material (second joining material) 33. Accordingly, a part between the second window member 31 and the second frame member 32 is hermetically sealed. The joining material 33 is, for example, a metal brazing material and is, more specifically, a titanium-doped silver brazing material.

An outer surface of the second portion 32b is provided with a circular ring-shaped flange portion 32f which protrudes outward. The second frame member 32 is fixed to the housing 10 while the flange portion 32f is disposed inside the middle portion 12b of the second opening 12. In this state, a part of the first portion 32a of the second frame member 32 protrudes from the second opening 12. The second window member 31 is disposed so as to face the intersection C between the first optical axis A1 and the second optical axis A2. In this example, the light incident surface and the light emitting surface of the second window member 31 are flat surfaces which extend so as to be perpendicular to the Y-axis direction.

The second frame member 32 is hermetically fixed to the housing by laser welding. More specifically, a contact portion between the flange portion 32f and the inner surface of the middle portion 12b of the second opening 12 is irradiated with laser from the outside to be welded over the entire circumference, so that the second frame member 32 is hermetically joined to the housing 10. Accordingly, a part between the second frame member 32 and the housing 10 is hermetically sealed. In this way, the second window member 31 is hermetically joined to the second frame member 32 by the joining material 33 and is hermetically fixed to the housing 10 through the second frame member 32. Since the second frame member 32 is interposed between the second window member 31 and the housing 10, problems caused by a difference in thermal expansion rate between the second window member 31 and the housing 10 can be suppressed.

The first electrode 40 extends along an X-axis direction (predetermined direction) which is perpendicular to both the Y-axis direction and the Z-axis direction. The first electrode 40 faces the second electrode 50 with the intersection C between the first optical axis A1 and the second optical axis A2 interposed therebetween. A distance between the intersection C and a front end of the first electrode 40 in the X-axis direction is the same as a distance between the intersection C and a front end of the second electrode 50. The first electrode 40 is formed of, for example, a metal material such as tungsten. The first electrode 40 is fixed to the housing 10 via a first insulation member 7 at the base end side thereof and is electrically separated from the housing 10. The first electrode 40 is formed in a substantially rod shape as a whole. The first electrode 40 includes a first support portion (first portion) 41 formed at a base end side and a first discharge portion (second portion) 42 located closer to the front end of the second electrode 50 than the first support portion 41. The first discharge portion 42 has a diameter smaller than that of the first support portion 41 and has a pointed shape. A boundary portion between the first support portion 41 and the first discharge portion 42 is provided with a tapered portion 42s. The tapered portion 42s has a surface which is inclined so that a diameter increases as it goes toward the first support portion 41. The tapered portion 42s is disposed at a positional relationship that forms a recess with respect to a surface 71a of a main body portion 71 to be described later. The first support portion 41 is a middle portion (a part) of the first electrode 40 in the X-axis direction. An end portion 41a at a base end side opposite to the first discharge portion 42 in the first support portion 41 is formed so as to be thicker than a portion other than the end portion 41a. The first discharge portion 42 is formed in a rod shape and is disposed inside the housing 10 (that is, inside the internal space S3).

The first insulation member 7 includes the main body portion 71 and a cylindrical portion 72. The first insulation member 7 is formed of, for example, an insulating material such as alumina (aluminum oxide) or ceramic. The main body portion 71 is formed in, for example, a columnar shape and holds the first support portion 41 of the first electrode 40. The main body portion 71 includes the surface 71a perpendicular to the X-axis direction. The surface 71a is a surface exposed to the internal space S3. The surface 71a is provided with an insertion hole 71b which penetrates the main body portion 71 in the X-axis direction and the first support portion 41 is disposed inside the insertion hole 71b and is fixed. The cylindrical portion 72 is formed in a cylindrical shape so as to extend along the X-axis direction from the surface 71a of the main body portion 71 and surrounds a part at the side (the base end side) of the first support portion 41 in the first discharge portion 42.

The end portion 41a of the first support portion 41 is hermetically joined to the inner surface of the insertion hole 71b over the entire circumference by a joining material 43. Accordingly, a gap between the first electrode 40 and the first insulation member 7 is hermetically sealed. The joining material 43 is, for example, a metal brazing material and is, more specifically, a titanium-doped silver brazing material.

The surface 71a of the main body portion 71 is roughened. In this embodiment, the surface 71a is roughened by forming a depression 73 in the surface 71a. The depression 73 extends in a circular ring shape so as to surround the first discharge portion 42 as viewed from the X-axis direction. The depression 73 is disposed so as to be separated from each of the first electrode 40 and the cylindrical portion 72. The shape of the depression 73 in a cross-section parallel to the X-axis direction is, for example, a rectangular shape.

The first insulation member 7 is hermetically fixed to the housing 10 via a connection member 8. An outer surface of the main body portion 71 of the first insulation member 7 is provided with a circular ring-shaped flange portion 74 which protrudes outward. The connection member 8 is formed of a metal material such as stainless steel. The connection member 8 includes a first portion 81 having a cylindrical shape and a second portion 82 having a ring-shaped flat plate shape and extending from a first end portion 81a of the first portion 81 inward in the radial direction. A front end of the second portion 82 contacts the outer surface of the main body portion 71. The flange portion 74 contacts the first portion 81 and the second portion 82.

The second portion 82 of the connection member 8 is hermetically joined to the outer surface of the main body portion 71 of the first insulation member 7 over the entire circumference by a joining material 83. Accordingly, a part between the connection member 8 and the first insulation member 7 is hermetically sealed. The joining material 83 is, for example, a metal brazing material and is, more specifically, a titanium-doped silver brazing material.

The connection member 8 is hermetically fixed to the housing 10 by laser welding. More specifically, a third opening 13 is formed in the housing 10. The cylindrical portion 72 of the first insulation member 7 is disposed inside the third opening 13 while being apart from the third opening 13. The connection member 8 is disposed so that a second end portion 81b of the first portion 81 contacts an opening edge of the third opening 13. A contact portion between the first portion 81 and the opening edge of the third opening 13 is irradiated with laser from the outside to be welded over the entire circumference, so that the connection member 8 is hermetically joined to the housing 10. Accordingly, a part between the connection member 8 and the housing 10 is hermetically sealed. In this way, the first insulation member 7 is hermetically joined to the connection member 8 and is hermetically fixed to the housing 10 via the connection member 8. In this state, the first electrode 40 extends so as to penetrate the third opening 13. The third opening 13 is hermetically sealed by the first electrode 40, the first insulation member 7, and the connection member 8. The connection member 8 can also be regarded as forming a part of the housing 10.

The second electrode 50 extends along the X-axis direction. The front end of the second electrode 50 faces the first electrode 40 with the intersection C between the first optical axis A1 and the second optical axis A2 interposed therebetween. The second electrode 50 is formed of, for example, a metal material such as tungsten. The second electrode 50 is electrically connected to the housing 10. The second electrode 50 is formed in a substantially rod shape having diameter larger than that of the first electrode 40 as a whole. The second electrode 50 includes a second support portion 51 formed at a base end side and a second discharge portion 52 located closer to the front end of the first electrode 40 than the second support portion 51 and having a pointed shape. The second support portion 51 is a middle portion (a part) of the second electrode 50 in the X-axis direction. The second discharge portion 52 is formed in a rod shape and is disposed inside the housing 10 (that is, inside the internal space S3).

A fourth opening 14 is formed in the housing 10. The second support portion 51 of the second electrode 50 is disposed inside the fourth opening 14 so that an outer surface of the second support portion 51 contacts the inner surface of the fourth opening 14. The second support portion 51 is hermetically joined to the inner surface of the fourth opening 14 over the entire circumference by a joining material 53. Accordingly, a part between the second electrode 50 and the housing 10 is hermetically sealed. The joining material 53 is, for example, a metal brazing material and is, more specifically, a titanium-doped silver brazing material.

The housing 10 is provided with an enclosing hole 15 for enclosing the discharge gas G1 in the internal space S3. An enclosing tube 16 is connected to the enclosing hole 15. The enclosing tube 16 is formed of, for example, a metal material such as copper. An end portion 16a opposite to the enclosing hole 15 in the enclosing tube 16 is sealed. A protection member 17 is attached to the enclosing tube 16 so as to cover the sealed end portion 16a. The protection member 17 is formed of, for example, a resin material such as rubber.

An outer surface of the enclosing tube 16 is joined to the inner surface of the enclosing hole 15 over the entire circumference by a joining material 18. Accordingly, a part between the enclosing tube 16 and the housing 10 is hermetically sealed. The joining material 18 is, for example, a metal brazing material and is, more specifically, a titanium-doped silver brazing material. When enclosing the discharge gas G1, for example, the discharge gas G1 is introduced into the internal space S3 through the enclosing tube 16 and the end portion 16a of the enclosing tube 16 is sealed by pressing and cutting (cutting out) the enclosing tube 16 while crushing the enclosing tube 16. Then, the protection member 17 is attached to the enclosing tube 16. Such a direct enclosing method is advantageous in the following points compared to a trap method using liquid nitrogen. That is, in the trap method, there is concern that the window member may be distorted when liquid nitrogen is placed in the light emitting sealed body. In the direct enclosing method, such a situation can be suppressed. Further, a variation in enclosing pressure may be generated in the trap method, but such a variation can be suppressed in the direct enclosing method. The trap method may be used when enclosing the discharge gas in a glass bulb.

In the light emitting sealed body 2, the internal space S3 is defined by the housing 10, the first window portion 20, and the second window portion 30. In the light emitting sealed body 2, the internal space S3 is also defined by the first electrode 40, the second electrode 50, the first insulation member 7, the connection member 8, and the enclosing tube 16. The entire internal space S3 is filled with the discharge gas G1. That is, the internal space S3 is filled with the discharge gas G1. The discharge gas G1 contacts the first window member 21, the first frame member 22, the second window member 31, and the second frame member 32. The enclosing pressure (the maximal enclosing pressure) of the discharge gas G1 is, for example, about 5 MPa (50 atm). The light emitting sealed body 2 can withstand an internal pressure of 15 MPa or more. In the light emitting sealed body 2, a container 100 enclosed with the discharge gas G1 is constituted by the housing 10, the first window portion 20, and the second window portion 30. The container 100 is configured such that the first light L1 can be incident to the container 100 and the second light L2 can be emitted from the container 100. As described above, in this example, the first light L1 is incident to the container 100 through the first window portion 20 and the second light L2 is emitted from the container 100 to the outside through the second window portion 30. The first discharge portion 42 of the first electrode 40 and the second discharge portion 52 of the second electrode 50 are disposed inside the container 100.

[Operation Example of Laser Excitation Light Source]

The laser excitation light source 1 includes a voltage application circuit VC (FIG. 13A) disposed inside the casing 6. The voltage application circuit (the voltage application unit) VC is configured to control a potential difference between the first electrode 40 and the second electrode 50 by adjusting a voltage applied to the first electrode 40. As an example, the voltage application circuit VC applies a negative voltage pulse to the first electrode 40 by setting the second electrode 50 as a ground potential. Accordingly, electrons are emitted from the first electrode 40 toward the second electrode 50. As a result, an arc discharge is generated and plasma is generated in a gap (the intersection C) between the first electrode 40 and the second electrode 50. This plasma is irradiated with the first light L1 from the light introduction unit R through the first window member 21. Accordingly, the generated plasma is maintained. The second light L2 which is the light from the plasma is emitted to the outside as output light through the second window member 31. In the laser excitation light source 1, the second light L2 is emitted from two second window members 31 toward both sides of the Y-axis direction. The voltage application circuit VC may apply a positive voltage pulse to the first electrode 40 as a trigger voltage for generating plasma. In this case, electrons are emitted from the second electrode 50 toward the first electrode 40.

[Detailed Configuration of First Electrode and Second Electrode]

Figure 6:
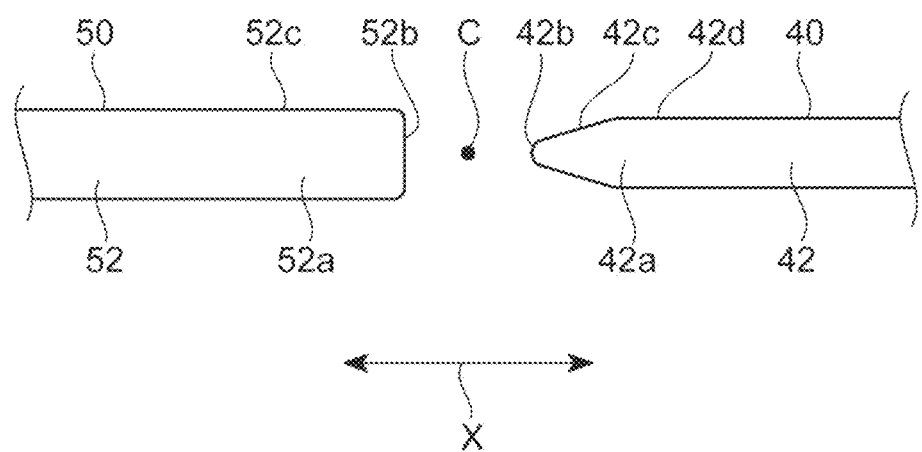
FIG. 6 is a partially enlarged view of FIG. 5.

As illustrated in FIG. 6, the first discharge portion 42 of the first electrode 40 faces the second discharge portion 52 of the second electrode 50 in the X-axis direction. An end portion 42a of the first discharge portion 42 on the side of the second discharge portion 52 has a tapered shape (pointed shape) that becomes thinner as it goes toward the second discharge portion 52. The end portion 42a of the first discharge portion 42 becomes sharpened toward the second discharge portion 52. The end portion 42a includes an end surface 42b, a tapered surface 42c, and a columnar surface 42d. The end surface 42b is curved so as to protrude toward the second discharge portion 52. The tapered surface 42c is a truncated cone surface which is inclined with respect to the X-axis direction so as to be tapered as it goes toward the second discharge portion 52 and is continuous to the end surface 42b. The columnar surface 42d is a columnar surface which extends in the X-axis direction so as to surround the center line of the first discharge portion 42 and is continuous with the tapered surface 42c.

The taper angle of the tapered surface 42c is 45° or less. In this example, the taper angle is 30°. The taper angle of the tapered surface 42c is an angle between two lines along both edges of the tapered surface 42c when viewed from a direction perpendicular to the X-axis direction.

An end portion 52a of the second discharge portion 52 on the side of the first discharge portion 42 includes an end surface 52b and a columnar surface 52c. The end surface 52b faces the end surface 42b and the tapered surface 42c of the first discharge portion 42 in the X-axis direction. A distance between the end surfaces 42b and 52b in the X-axis direction is, for example, about 0.7 mm. The end surface 52b extends along a plane perpendicular to the X-axis direction. In this example, the end surface 52b is a flat surface which is perpendicular to the X-axis direction. The columnar surface 52c is a columnar surface which extends in the X-axis direction so as to surround the center line of the second discharge portion 52 and is continuous with the end surface 52b.

Figure 7A:
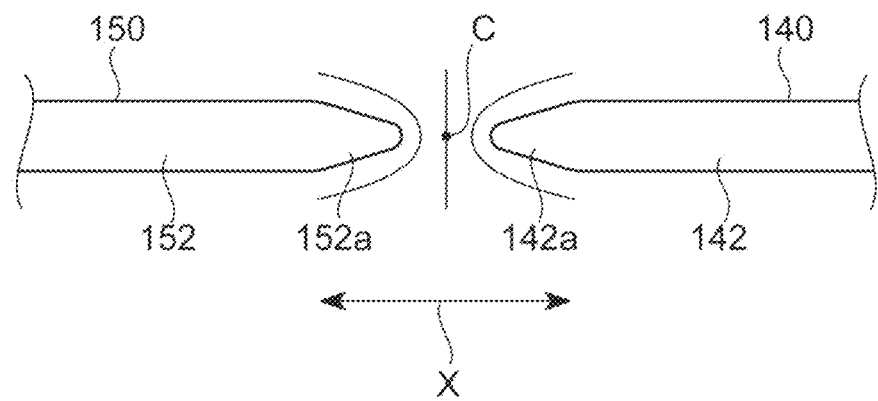
FIG. 7A is a diagram illustrating an example of an electric field distribution generated in a first comparative example.
Figure 7B:
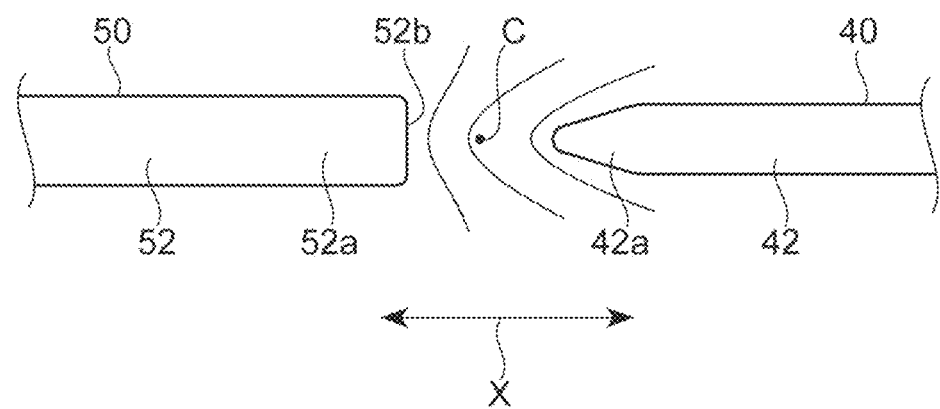
FIG. 7B is a diagram illustrating an example of an electric field distribution generated in a configuration of FIG. 6.

Referring to FIGS. 7A and 7B, the advantage of the shapes of the first electrode 40 and the second electrode 50 will be described. In FIG. 7A, an electric field distribution is illustrated by equipotential lines. Among the equipotential lines, the equipotential lines which are closer to a first electrode 140 have lower potentials. This is also the same in FIG. 7B and FIGS. 8 to 10 to be described later. In a first comparative example illustrated in FIG. 7A, each of an end portion 142a of a first discharge portion 142 of the first electrode 140 and an end portion 152a of a second discharge portion 152 of a second electrode 150 is sharpened. In the first comparative example, as illustrated in FIG. 7A, an electric field distribution which is symmetrical with respect to a plane passing through the intersection C and perpendicular to the X-axis direction is generated.

In contrast, in the configuration of the embodiment, an electric field distribution illustrated in FIG. 7B is generated. Compared to the case of the first comparative example, electric field strength (electric field density) in the vicinity of the end portion 42a of the first discharge portion 42 is increased. This is because the end surface 52b of the second discharge portion 52 extends along a plane perpendicular to the X-axis direction. That is, in the embodiment, the electric field distribution is compressed in the vicinity of the end portion 42a of the first discharge portion 42 and the electric field density is increased.

FIG. 8 is a diagram illustrating an example of an electric field distribution generated in a second comparative example. In FIG. 8, only the vicinity of the upper half of the first electrode 140 and the second electrode 150 is illustrated in the drawing, but a similar electric field distribution is also generated in the vicinity of the lower half. This is also the same in FIGS. 9 and 10. In the second comparative example, each of the end portion 142a of the first discharge portion 142 of the first electrode 140 and the end portion 152a of the second discharge portion 152 of the second electrode 150 is sharpened. The taper angle of the tapered surface 142c of the end portion 142a and the tapered surface 152c of the end portion 152a are 90°.

FIG. 9 is a diagram illustrating an example of an electric field distribution generated in a first modified example. In the first modified example, the taper angle of the tapered surface 42c of the first discharge portion 42 is 90°. The first modified example has the same configuration as that of the above-described embodiment except for the other points. From FIGS. 8 and 9, in the first modified example, it is known that the electric field density in the vicinity of the end portion 42a (the end surface 42b) of the first electrode 40 is increased compared to the second comparative example.

FIG. 10 is a diagram illustrating an example of an electric field distribution generated in the configuration of the embodiment. As described above, in the embodiment, the taper angle of the tapered surface 42c of the first discharge portion 42 is 30°. From FIGS. 8 and 10, in the embodiment, it is known that an electric field density in the vicinity of the end portion 42a (the end surface 42b) of the first electrode 40 is increased compared to the second comparative example. Further, from FIGS. 9 and 10, in the embodiment, it is known that an electric field density in the vicinity of the end portion 42a of the first electrode 40 is increased compared to the first modified example.

[Detail of Voltage Application Method]

Figure 11A:
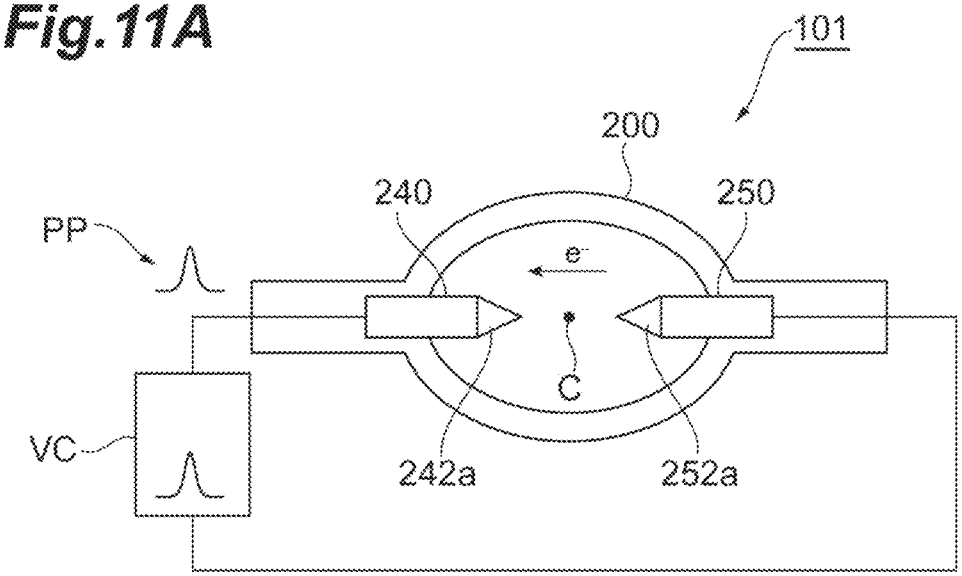
FIG. 11A is a diagram for describing a voltage application method of a third comparative example.

FIGS. 11A to 12B are diagrams for describing a voltage application method of a third comparative example. In FIGS. 11A and 12A, a container 200 is simply illustrated. A laser excitation light source 101 of the third comparative example includes a first electrode 240, a second electrode 250, and the voltage application circuit VC which applies a voltage to the first electrode 240 and the second electrode 250. Each of the end portion 242a of the first electrode 240 and the end portion 252a of the second electrode 250 is sharpened.

Figure 11B:
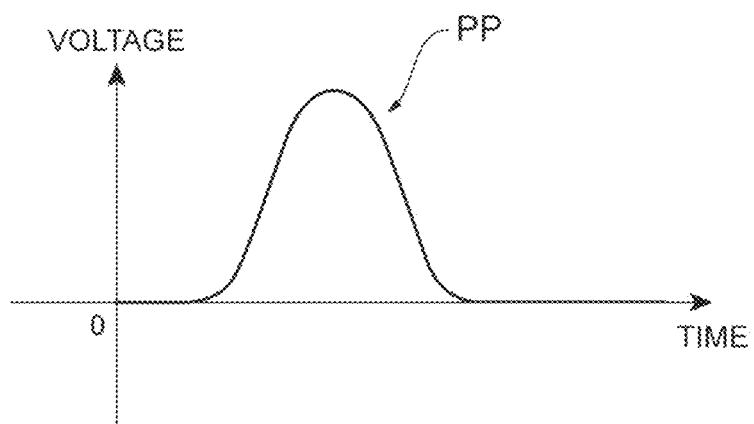
FIG. 11B is a diagram for describing the voltage application method of the third comparative example.

As illustrated in FIGS. 11A and 11B, in the third comparative example, the voltage application circuit VC applies a positive voltage pulse PP rising toward a positive side to the first electrode 240 as a trigger voltage for generating plasma between the first electrode 240 and the second electrode 250. Accordingly, it is expected that electrons are emitted from the second electrode 250 toward the first electrode 240 so that a discharge is generated.

Figure 12A:
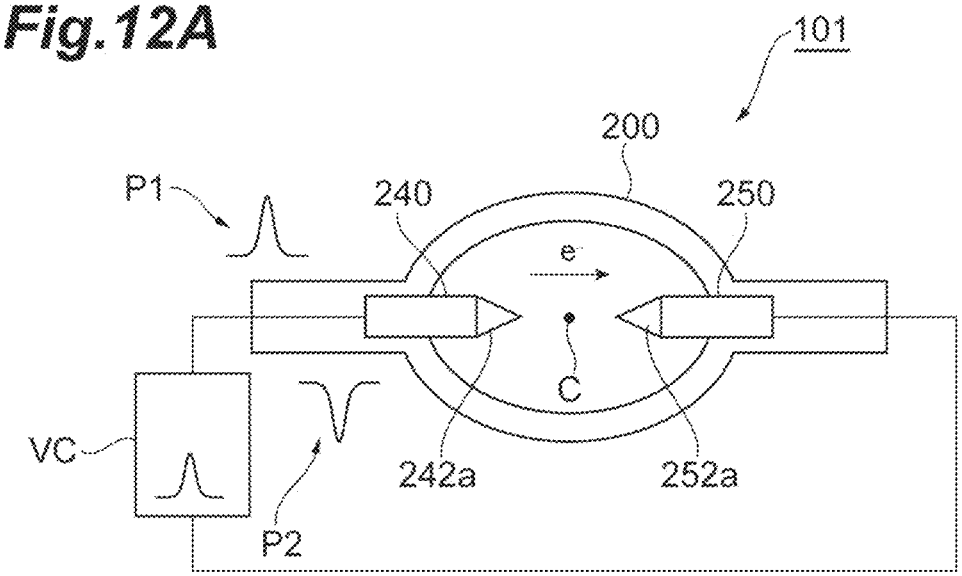
FIG. 12A is a diagram for describing the voltage application method of the third comparative example.
Figure 12B:
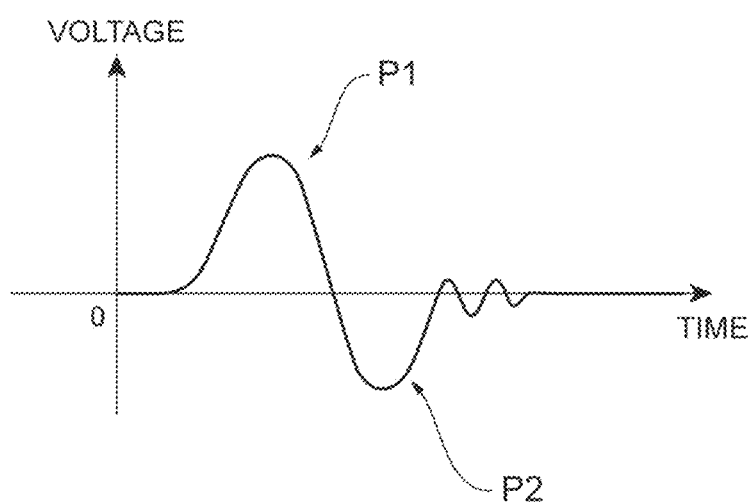
FIG. 12B is a diagram for describing the voltage application method of the third comparative example.

However, in the third comparative example, electrons are subordinately dragged from the second electrode 250 by applying the positive voltage pulse PP to the first electrode 240. For that reason, efficiency is low and a discharge is not generated between the first electrode 240 and the second electrode 250 as intended. In this case, as illustrated in FIGS. 12A and 12B, a discharge is generated by a second pulse P2 which is a negative voltage pulse following a first pulse P1 instead of the first pulse P1 which is a positive voltage pulse. In a discharge caused by the second pulse P2, electrons are emitted from the first electrode 240 toward the second electrode 250. The second pulse P2 is a pulse generated by the ringing phenomenon when the discharge is not generated by the first pulse P1. An absolute value of a peak voltage of the second pulse P2 is smaller than an absolute value of a peak voltage of the first pulse P1. Thus, a discharge efficiency of the second pulse P2 is lower than a discharge efficiency of the first pulse P1.

Figure 13A:
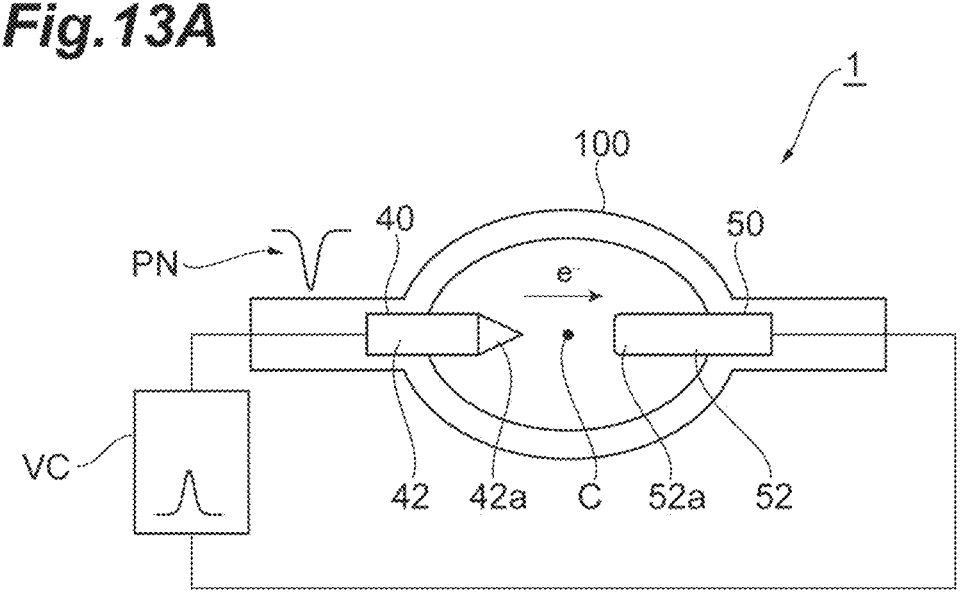
FIG. 13A is a diagram for describing a voltage application method of the embodiment.
Figure 13B:
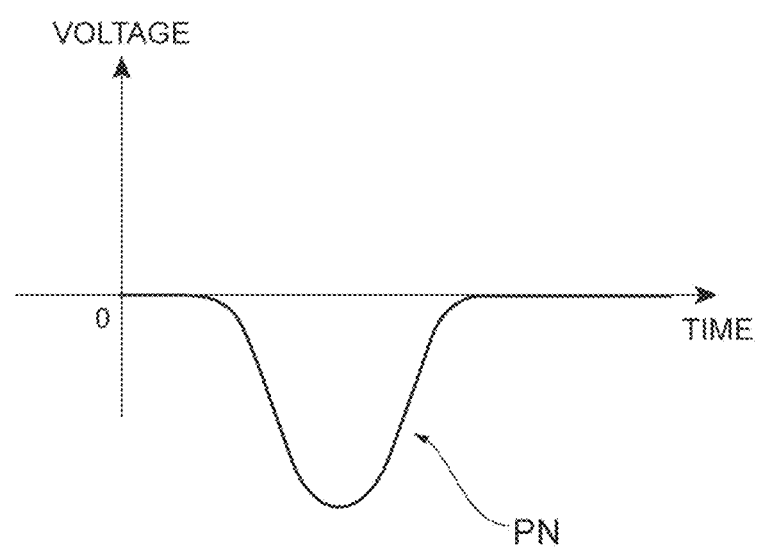
FIG. 13B is a diagram for describing the voltage application method of the embodiment.

FIGS. 13A and 13B are diagrams for describing a voltage application method of the embodiment. In FIG. 13A, the container 100 is simply illustrated. This is also the same in FIG. 15 to be described later. The laser excitation light source 1 of the embodiment includes the voltage application circuit VC which is electrically connected to the first electrode 40 and the second electrode 50. The voltage application circuit VC controls a potential difference between the first electrode 40 and the second electrode 50 by adjusting a voltage applied to the first electrode 40. As described above, in the laser excitation light source 1, the end portion 42a of the first discharge portion 42 has a shape in which a thickness is thinned as it goes toward the second discharge portion 52 and the end surface 52b of the second discharge portion 52 extends along a plane perpendicular to the X-axis direction.

In the embodiment, the voltage application circuit VC applies a negative voltage pulse PN rising toward a negative side to the first electrode 40 as a trigger voltage for generating plasma between the first electrode 40 and the second electrode 50. Accordingly, electrons are emitted from the first electrode 40 toward the second electrode 50 so that a discharge is generated. In the voltage application method of the embodiment, a discharge efficiency can be increased compared to a case in which a discharge is generated by the second pulse P2 caused by the ringing phenomenon as in the third comparative example. As a result, the discharge starting voltage can be reduced.

[Function and Effect]

As described above, in the laser excitation light source 1, the end portion 42a of the first discharge portion 42 has a shape in which a thickness is thinned as it goes toward the second discharge portion 52 and the end surface 52b of the second discharge portion 52 extends along a plane perpendicular to the X-axis direction (the extending direction of the first discharge portion 42). Accordingly, the electric field strength (electric field density) in the vicinity of the end portion 42a of the first discharge portion 42 can be increased. Then, the voltage application circuit VC controls a potential difference between the first electrode 40 and the second electrode 50 by adjusting a voltage applied to the first electrode 40. In this way, a discharge can easily occur by applying a voltage to the first electrode 40 of which the electric field strength in the vicinity of the end portion 42a can be increased and a discharge starting voltage can be reduced. Further, since it is possible to widen a gap between the first electrode 40 and the second electrode 50, it is possible to alleviate the accuracy required for the positions of the first electrode 40 and the second electrode 50. Further, it is possible to suppress a situation in which the front ends of the first electrode 40 and the second electrode 50 are melted by heat.

The voltage application circuit VC applies a negative voltage pulse to the first electrode 40 as a trigger voltage for generating plasma between the first electrode 40 and the second electrode 50. Accordingly, a discharge can be further easily generated as described above.

The taper angle of the tapered surface 42c of the end portion 42a of the first discharge portion 42 is 120° or less. Accordingly, the electric field strength in the vicinity of the end portion 42a of the first discharge portion 42 can be further increased and a discharge can be further easily generated.

The taper angle of the tapered surface 42c is 45° or less. Accordingly, the electric field strength in the vicinity of the end portion 42a of the first discharge portion 42 can be still further increased and a discharge can be still further easily generated.

The housing 10 constituting the container 100 is formed of a light shielding material that does not allow the first light L1 and the second light L2 to be transmitted therethrough. Accordingly, since a high-strength material can be selected as the light shielding material, the enclosed pressure of the discharge gas G1 can be increased. As a result, high efficiency and high output can be achieved.

The housing 10 is formed of a metal material. Accordingly, the enclosed pressure of the discharge gas G1 can be further increased.

The first electrode 40 is fixed to the housing 10 through the first insulation member 7 and is electrically separated from the housing 10. Accordingly, a voltage can be applied to the first electrode 40.

The second electrode 50 is electrically connected to the housing 10.

Accordingly, the second electrode 50 can be set to a ground potential by the connection to the housing 10 and a wiring for the ground potential can be omitted.

MODIFIED EXAMPLES

Figure 14:
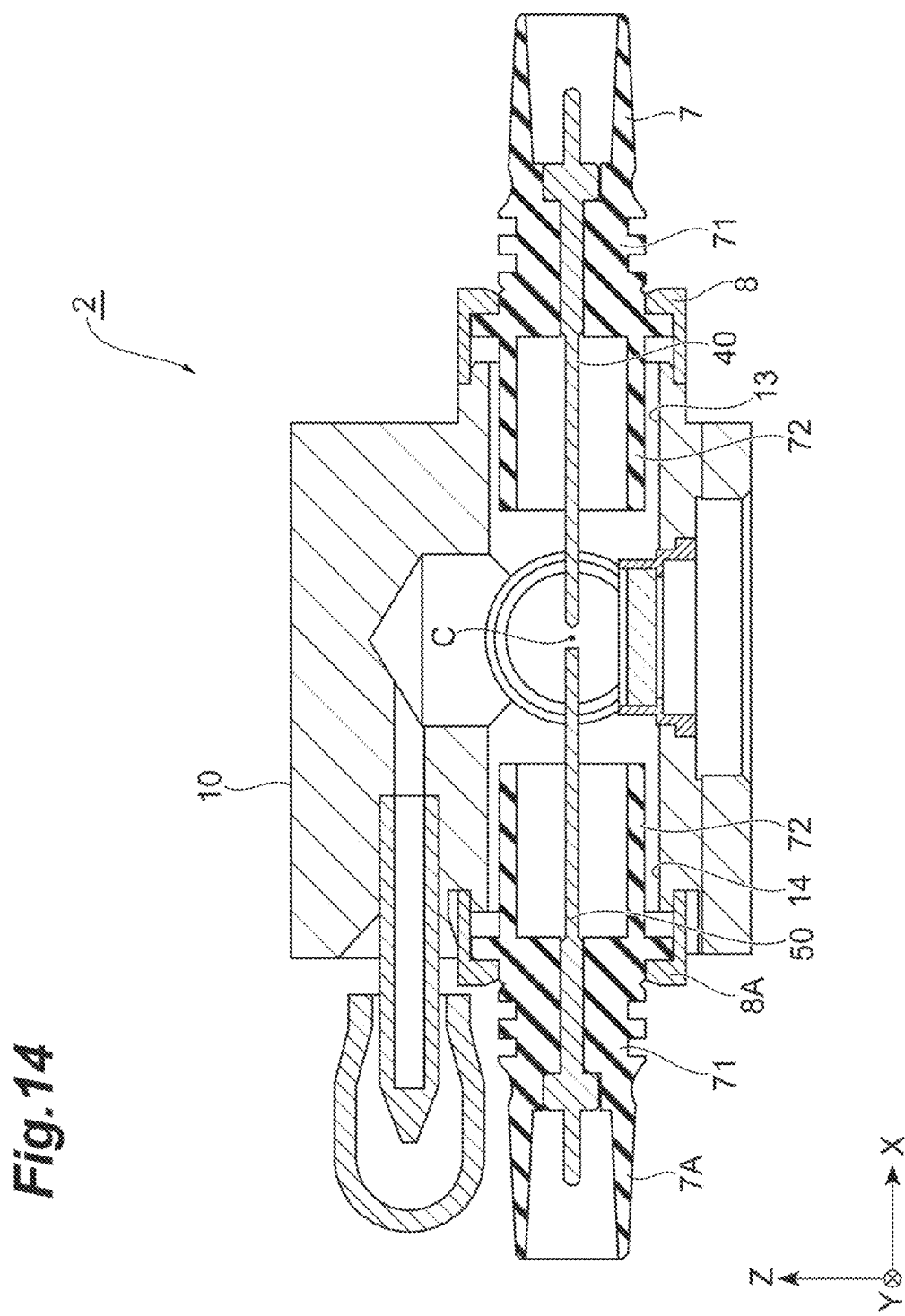
FIG. 14 is a cross-sectional view of a light emitting sealed body according to a second modified example.

In the light emitting sealed body 2 of the second modified example illustrated in FIG. 14, the second electrode 50 is fixed to the housing 10 via a second insulation member 7A and is electrically separated from the housing 10. The second insulation member 7A is hermetically fixed to the housing 10 via a connection member 8A. The second insulation member 7A is configured and connected similarly to the first insulation member 7 and the connection member 8A is configured and connected similarly to the connection member 8. In the second modified example, since the second electrode 50 is electrically separated from the housing 10, a voltage can be individually applied to the first electrode 40 and the second electrode 50.

Figure 15:
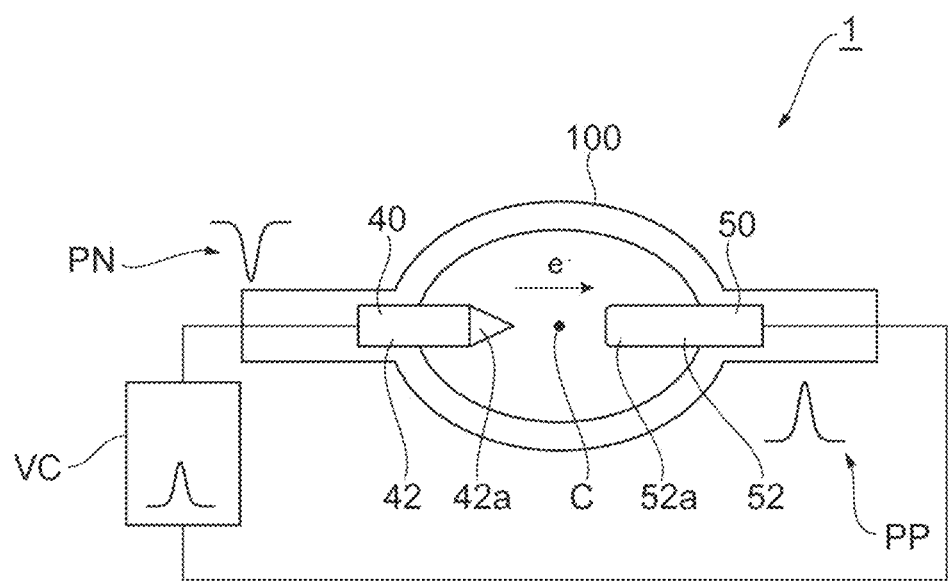
FIG. 15 is a diagram for describing a voltage application method of the second modified example.

For example, as illustrated in FIG. 15, the voltage application circuit VC may apply the positive voltage pulse PP to the second electrode 50 in accordance with a timing at which the negative voltage pulse PN is applied to the first electrode 40. A timing at which the positive voltage pulse PP applied to the second electrode 50 becomes a peak may match a timing at which the negative voltage pulse PN applied to the first electrode 40 becomes a peak. That is, the voltage application circuit VC may apply the positive voltage pulse PP having a phase opposite to that of the negative voltage pulse PN applied to the first electrode 40 to the second electrode 50. In this case, a potential difference is generated between the first electrode 40 and the second electrode 50 by the negative voltage pulse PN and the positive voltage pulse PP.

Figure 16A:
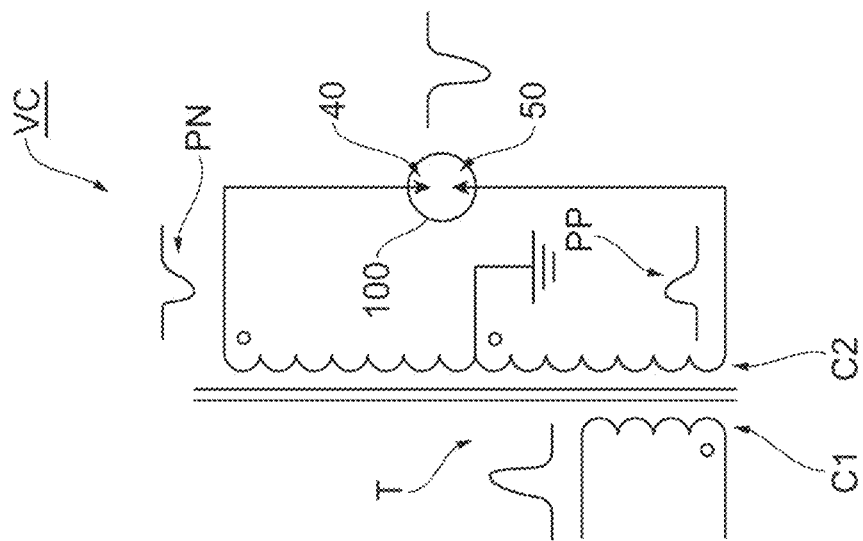
FIG. 16A is a diagram illustrating a voltage application circuit of the embodiment.
Figure 16B:
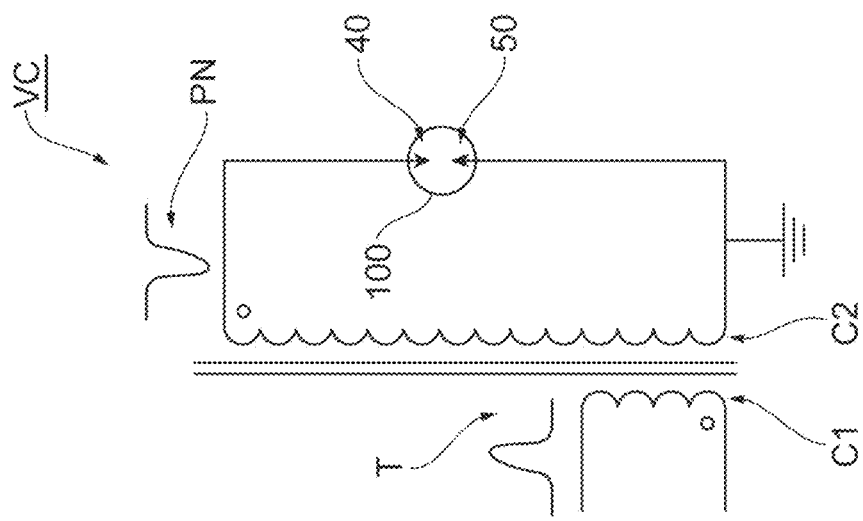
FIG. 16B is a diagram illustrating a voltage application circuit of the second modified example.

FIG. 16B illustrates an example of the voltage application circuit VC for realizing such a voltage application method. FIG. 16A illustrates an example of the voltage application circuit VC for realizing the voltage application method of the above-described embodiment. In the example of FIG. 16A, the voltage application circuit VC includes a transformer T including a primary coil C1 and a secondary coil C2. A voltage applied to the primary coil C1 is transmitted to the secondary coil C2 while boosted and the negative voltage pulse PN is applied to the first electrode 40. The second electrode 50 is grounded. On the other hand, in the example of FIG. 16B, the secondary coil C2 is grounded at a middle portion and is divided into two parts. Accordingly, the secondary coil C2 is configured to be able to output voltages of both polarities. When the voltage applied to the primary coil C1 is transmitted to the secondary coil C2 while boosted, the negative voltage pulse PN having a peak voltage of a half of the peak voltage of the negative voltage pulse PN in the example of FIG. 16A is applied to the first electrode 40 and the positive voltage pulse PP having an absolute value of a peak voltage of a half of the peak voltage of the negative voltage pulse PN in the example of FIG. 16A is applied to the second electrode 50. In the example of FIG. 16B, a potential difference generated between the first electrode 40 and the second electrode 50 is the same as the potential difference generated in the example of FIG. 16A.

In the voltage application method of the example of FIG. 16B, an absolute value of the peak voltage of each of the negative voltage pulse PN applied to the first electrode 40 and the positive voltage pulse PP applied to the second electrode 50 can be reduced compared to a case in which the negative voltage pulse PN is applied only to the first electrode 40 similarly to the example of FIG. 16A. As a result, for example, noise caused when generating the negative voltage pulse PN and the positive voltage pulse PP can be reduced.

The present disclosure is not limited to the embodiment and the modified example described above. For example, the material and shape of each component are not limited to the materials and shapes described above and various materials and shapes can be adopted. In the present disclosure, "A and/or B" means "at least one of A and B". The taper angle of the tapered surface 42c of the end portion 42a of the first discharge portion 42 may be 90° or less or 30° or less.

In the above-described embodiment, the container 100 includes the housing 10, the first window portion 20, and the second window portion 30, but the container 100 may be, for example, a glass housing (glass bulb) which is entirely formed of quartz. In this case, the first light L1 and the second light L2 are transmitted through the glass housing so as to be incident thereinto or emitted therefrom. The first discharge portion 42 of the first electrode 40 and the second discharge portion 52 of the second electrode 50 are disposed inside the glass housing.

When the glass housing is used in the laser excitation light source, a pair of electrodes are generally formed in the same shape. In contrast, in the laser excitation light source 1, the first electrode 40 and the second electrode 50 are formed in different shapes. As the light source in which a pair of electrodes are disposed inside the glass housing, a Xenon lamp is known. In the Xenon lamp, light is generated from thermoelectrons generated by a discharge in a xenon gas. Since the electron supply characteristics are important, the pair of electrodes may be formed of different materials. For example, a cathode is formed of thorium-containing tungsten or bismuth and an anode is formed of pure tungsten. In the Xenon lamp, a discharge is continuously generated, but in the laser excitation light source 1, it is only necessary to generate plasma when starting a discharge, and the first electrode 40 and the second electrode 50 do not function when maintaining a discharge. For that reason, the first electrode 40 and the second electrode 50 are formed of pure metal (for example, tungsten) that has high heat resistance and is hard to emit a substance.

In the above-described embodiment, two second openings 12 are formed, but only one second opening 12 may be formed or three or more second openings 12 may be formed. A material forming the housing 10 may not be necessarily a metal material or may be an insulating material, for example, ceramic or the like. Each of the first window member 21 and the second window member 31 may be formed of diamond or sapphire or may be formed of magnesium fluoride or quartz. The first window member 21 and/or the second window member 31 may be formed of Kovar glass.

The laser light source 3 may not be provided inside the laser excitation light source 1. For example, the laser excitation light source 1 may include an optical fiber which guides light from a light source disposed at the outside to the mirror 4 instead of the laser light source 3. In this case, a light introduction unit R which causes the first light L1 to be incident to the first opening 11 along the first optical axis A1 is configured by the optical fiber, the mirror 4, and the optical system 5.

The first light L1 may be incident to a position closer to the second electrode 50 than the first electrode 40. That is, in the X-axis direction, a distance between the intersection C and the first electrode 40 may be longer than a distance between the intersection C and the second electrode 50. In this case, since the end surface 52b of the second electrode 50 is a flat surface and is less likely to melt than the sharpened end portion 42a of the first electrode 40, there is a thermal advantage.

What is claimed is:
1. A light emitting unit comprising:
a light emitting sealed body; and
a voltage application circuit,
wherein the light emitting sealed body includes
a container which encloses a discharge gas therein and is configured such that laser light for maintaining plasma generated in the discharge gas can be incident to the container and light from the plasma can be emitted from the container, a first electrode which includes a first discharge portion having a rod shape and disposed inside the container, and a second electrode which includes a second discharge portion having a rod shape and disposed inside the container so as to face the first discharge portion in an extending direction of the first discharge portion, wherein an end portion of the first discharge portion on a side of the second discharge portion has a shape in which a thickness is thinned as it goes toward the second discharge portion, wherein an end surface of the second discharge portion on a side of the first discharge portion extends along a plane perpendicular to the extending direction, wherein a first diameter of an end surface of the first discharge portion on the side of the second discharge portion is smaller than a second diameter of the end surface of the second discharge portion, and wherein the voltage application circuit is configured to control a potential difference between the first electrode and the second electrode by adjusting a voltage applied to at least the first electrode.

2. The light emitting unit according to claim 1,
wherein the voltage application circuit is configured to apply a negative voltage pulse to the first electrode as a trigger voltage for generating the plasma between the first electrode and the second electrode.

3. The light emitting unit according to claim 2,
wherein the voltage application circuit is configured to apply a positive voltage pulse to the second electrode in accordance with a timing at which the negative voltage pulse is applied to the first electrode.

4. The light emitting unit according to claim 1,
wherein the end portion of the first discharge portion has a tapered surface, and wherein a taper angle of the tapered surface is 120° or less.

5. The light emitting unit according to claim 4,
wherein the taper angle is 45° or less.

6. The light emitting unit according to claim 1,
wherein the container includes a housing which stores the discharge gas and is provided with a first opening to which first light is incident and a second opening from which second light is emitted, wherein the first light is the laser light and the second light is light from the plasma, a first window portion which hermetically seals the first opening and transmits the first light, and a second window portion which hermetically seals the second opening and transmits the second light, and wherein the housing is formed of a light shielding material that blocks the first light and the second light.

7. The light emitting unit according to claim 6,
wherein the housing is formed of a metal material.

8. The light emitting unit according to claim 6,
wherein the housing is formed of an insulating material.

9. The light emitting unit according to claim 7,
wherein the first electrode is fixed to the housing via an insulation member and is electrically separated from the housing.

10. The light emitting unit according to claim 9,
wherein the second electrode is electrically connected to the housing.

11. The light emitting unit according to claim 7,
wherein the first electrode is fixed to the housing via a first insulation member and is electrically separated from the housing and the second electrode is fixed to the housing via a second insulation member and is electrically separated from the housing.

12. A light source device comprising:
the light emitting unit according to claim 1; and
a light introduction unit which causes the laser light to be incident to the container.

* * * * *